(12) United States Patent
Skoptsov et al.

(10) Patent No.: US 12,528,753 B2
(45) Date of Patent: Jan. 20, 2026

(54) POLYCYCLIC AROMATIC MOLECULES, PITCH AND GRAPHITE, HAVING LOW IMPURITIES AND LARGE CRYSTALLINE STRUCTURE, AND PRODUCTS MADE THEREFROM

(71) Applicant: H QUEST VANGUARD, INC., Pittsburgh, PA (US)

(72) Inventors: George L. Skoptsov, Pittsburgh, PA (US); Aayush Mantri, Pittsburgh, PA (US); Vignesh Viswanathan, Pittsburgh, PA (US)

(73) Assignee: H QUEST VANGUARD, INC., Pittsburgh, PA (US)

( * ) Notice: Subject to any disclaimer, the term of this patent is extended or adjusted under 35 U.S.C. 154(b) by 312 days.

(21) Appl. No.: 18/468,423

(22) Filed: Sep. 15, 2023

(65) Prior Publication Data
US 2024/0092711 A1    Mar. 21, 2024

Related U.S. Application Data

(60) Provisional application No. 63/375,981, filed on Sep. 16, 2022.

(51) Int. Cl.
*C07C 13/62* (2006.01)
*B01D 3/10* (2006.01)
(Continued)

(52) U.S. Cl.
CPC ............... *C07C 13/62* (2013.01); *B01D 3/10* (2013.01); *C01B 32/205* (2017.08); *C07C 2/78* (2013.01);
(Continued)

(58) Field of Classification Search
CPC .. C07C 13/62; C07C 2/78; B01D 3/10; C01B 32/205; C10C 3/06; C10C 3/002;
(Continued)

(56) References Cited

U.S. PATENT DOCUMENTS 4,504,455 A * 3/1985 Otani ..................... D01F 9/145
423/447.6
4,596,652 A * 6/1986 Shibatani .................. C10C 1/19
208/22

(Continued)

FOREIGN PATENT DOCUMENTS

GB 2066228 A 7/1981
JP 04145193 5/1992
(Continued)

OTHER PUBLICATIONS

Translation of JP 2017048379A (Year: 2017).*
(Continued)

*Primary Examiner* — Ali Z Fadhel
(74) *Attorney, Agent, or Firm* — Fox Rothschild LLP (57) ABSTRACT

High-purity polycyclic aromatic hydrocarbons (PAHs) and the byproducts thereof, and methods for producing such products are disclosed. The PAHs may comprise an aromaticity index of about 0.65 to about 0.80. The PAHs may have quinoline insolubles and sulfur impurities of less than about 0.1 wt. % each. A tar or pitch comprising the high-purity PAHs and a method of producing such tar or pitch are disclosed. A synthetic graphite comprising high-purity PAHs is also disclosed. A method of making carbon pellets from high-purity PAHs is also disclosed.

29 Claims, 7 Drawing Sheets

(51) Int. Cl.
  *C01B 32/205* (2017.01)
  *C07C 2/78* (2006.01)
  *C10C 3/06* (2006.01)
  *C10L 5/08* (2006.01)

(52) U.S. Cl.
  CPC .................................. *C10C 3/06* (2013.01); *C10L 5/08* (2013.01); *C01P 2006/12* (2013.01); *C10L 2290/06* (2013.01)

(58) Field of Classification Search
  CPC .... C10L 5/08; C10L 2290/06; C10L 2270/04; C10L 1/00; C01P 2006/12; C10G 2400/30; C10G 1/00; C10G 15/08
  See application file for complete search history.

(56) References Cited

U.S. PATENT DOCUMENTS

| | | | | |
|---|---|---|---|---|
| 5,372,702 | A * | 12/1994 | Kojima | .................. C04B 35/83 106/274 |
| 5,746,906 | A * | 5/1998 | McHenry | ................ C10C 3/005 208/42 |
| 10,363,542 | B2 | 7/2019 | Johnson et al. | |
| 11,358,113 | B2 | 6/2022 | Strohm et al. | |
| 11,358,869 | B2 | 6/2022 | Zeller et al. | |
| 2004/0232041 | A1 * | 11/2004 | Kiser | ..................... C10G 45/44 208/22 |
| 2010/0307960 | A1 * | 12/2010 | Lissianski | ................ C10G 1/00 208/402 |
| 2015/0041309 | A1 | 2/2015 | Spitzl | |
| 2018/0022925 | A1 | 1/2018 | Hardman et al. | |
| 2020/0123458 | A1 | 4/2020 | Moore et al. | |
| 2020/0354294 | A1 | 11/2020 | Clennan et al. | |
| 2021/0245133 | A1 | 8/2021 | Soane et al. | |

FOREIGN PATENT DOCUMENTS

| | | | |
|---|---|---|---|
| JP | 2017048379 A | * | 3/2017 |
| WO | 2012023858 A1 | | 2/2012 |
| WO | 2022087708 A1 | | 5/2022 |

OTHER PUBLICATIONS

International Search Report and Written Opinionfor PCT/US223/074357 dated Jan. 8, 2024, 23 pages.

International Search Report and Written Opinion of PCT/US23/074369 dated Jan. 19, 2024. 12 pages.

* cited by examiner

POLYCYCLIC AROMATIC MOLECULES, PITCH AND GRAPHITE, HAVING LOW IMPURITIES AND LARGE CRYSTALLINE STRUCTURE, AND PRODUCTS MADE THEREFROM

RELATED APPLICATIONS AND CLAIM OF PRIORITY

This patent document claims priority to U.S. provisional patent application No. 63/375,981, filed Sep. 16, 2022, the disclosure of which is fully incorporated into this document by reference.

STATEMENT OF GOVERNMENT-SPONSORED RESEARCH

This invention was made with United States government support under DE-FE0031793 awarded by the U.S. Department of Energy. The United States government has certain rights in the invention.

TECHNICAL FIELD

This disclosure is related to processing of a feed stream and the production of high-purity and high-aromatic polycyclic aromatic hydrocarbons, tar or pitch, and graphite made therefrom.

BACKGROUND

Polycyclic aromatic hydrocarbons (PAHs) are a class of chemicals that occur naturally in coal, crude oil, and gasoline. They result from burning coal, oil, gas, wood, garbage, and tobacco.

PAHs encompass many compounds composed primarily of carbon and hydrogen ($C_XH_Y$), where carbon is mostly arranged in aromatic ring configuration with $sp^2$ hybridization. Examples of PAHs are naphthalene, anthracene, phenanthrene, acenaphthylene, acenaphthene, fluorene, fluoranthene, pyrene, benz[a]anthracene, chrysene, benzo[b]fluoranthene. PAH consist of fused rings connected to each other, ranging from the monocyclic molecule of benzene (molecular weight=78) up to nine-ringed structures (MW up to 478). PAHs can also contain small fractions of oxygen or nitrogen or other atoms. They are mostly used as intermediaries in pharmaceuticals, agricultural products, photographic products, thermosetting plastics, lubricating materials, and other chemical industries.

Coal tar and pitch are known to have high concentrations of PAHs, and PAHs can thus be used as an element to create tar and pitch. Tar and pitch have a large number of solid carbon particles. When the tar or pitch is dissolved in quinoline, the solid carbon particles typically do not dissolve. Thus, such particles are sometimes referred to as "quinoline insolubles." The type and amount of quinoline insolubles in tar or pitch can affect the product's quality or suitability for specific purposes. For instance, in the context of making carbon electrodes, some contents of these quinoline insoluble (QI) particles may be desired. Large amounts of quinoline insolubles, or particles of relatively large size, can cause issues such as increased abrasion and clogging of equipment. However, if the amount of quinoline insoluble is too small, the electrical properties and binding capabilities of the product may be too low. Thus, it is desirable to be able to control the amount of quinoline insoluble that coal tar and pitch contain. However, when pitch is used specifically as a feedstock for needle coke, carbon fiber, or synthetic graphite, QI particles interfere with the graphitization process and their presence significantly degrades the product quality. QI particles are often formed during formation of the tar or pitch, as portions of it carbonize into particles, such as in the coking process. Removal or separation of the naturally present QI particles from tar or pitch is difficult and costly due to high viscosity of the latter.

SUMMARY

High-purity polycyclic aromatic hydrocarbons are disclosed herein comprising less than about 0.1 wt. % quinoline insolubles and less than about 0.1 wt. % sulfur. The PAHs may exhibit an aromaticity index of about 0.65 to about 0.80, or about 0.10 to about 0.30, depending on the final product and the feedstock used. In some embodiments, the high-purity polycyclic aromatic hydrocarbons comprise about 0.05 wt. % to about 0.00 wt. % quinoline insolubles, or about 0.05 wt. % to about 0.00 wt. % sulfur. In various embodiments, such as embodiments in which the PAHs are used to produce methane tar or methane pitch, the high-purity polycyclic aromatic hydrocarbons may have an aromaticity index of about 0.65 to about 0.80, about 0.65 to about 0.75, about 0.70 to about 0.74, or about 0.70 to about 0.77. In other embodiments, the high-purity polycyclic aromatic hydrocarbons may have an aromaticity index of about 0.10 to about 0.30, or about 0.20 to about 0.25. The high-purity polycyclic aromatic hydrocarbons may contain less than about 5% by volume of single-ring phenols such as resorcinol, 2-methylphenol, 3-methylphenol, or 4-methylphenol, and/or over about 80% by volume of a mixture of 2-ring, 3-ring and 4 or more-ring aromatic hydrocarbons. The high-purity polycyclic aromatic hydrocarbons may be derived from decomposition of methane, natural gas, or other hydrocarbon feedstock, and/or co-generated with solid carbon in which the solid carbon optionally has a surface area from about 7 $m^2/g$ to about 520 $m^2/g$.

Tars and pitches are disclosed herein comprising the high-purity polycyclic aromatic hydrocarbons of any of the embodiments described above.

A synthetic graphite is disclosed herein comprising high-purity polycyclic aromatic hydrocarbons of any of the embodiments described above. The graphite may contain crystals of carbonized and graphitized high-purity polycyclic aromatic hydrocarbons having a lateral dimension (La) between about 400 Å and about 1500 Å and/or having a stacking height (Lc) between about 50 Å and about 2600 Å.

A method of making carbon pellets is disclosed. The method may comprise: providing high-purity polycyclic aromatic hydrocarbons of this disclosure and solid carbon, wherein optionally the high-purity polycyclic aromatic hydrocarbons and the solid carbon are co-generated; applying pressure, optionally of about 1.5 kPa to as much as about 30 MPa, to a mixture of high-purity polycyclic aromatic hydrocarbons and solid carbon to press the mixture into compressed pellets; and heating the compressed pellets at a temperature of about 600° C. to about 1000° C. to produce the carbon pellets. The co-generated solid carbon has a surface area from about 7 $m^2/g$ to about 520 $m^2/g$. The carbon pellets may have a density of about 800 $kg/m^3$ to about 1200 $kg/m^3$ or about 1000 $kg/m^3$ to about 1200 $kg/m^3$.

A method of making a tar or pitch from high-purity polycyclic aromatic hydrocarbons is disclosed. The method includes: making carbon pellets; heating the carbon pellets, optionally with microwave plasma and a gas, to a temperature of about 500° C. to about 1200° C.; and using vacuum distillation to remove the gas and desorbed polycyclic aromatic hydrocarbons using vacuum distillation leaving the tar or pitch. The method optionally may also include: applying a low heat, e.g., about 200° C. to about 300° C., to remove low boiling point polycyclic aromatic hydrocarbons.

A method of generating high-purity polycyclic aromatic hydrocarbons is disclosed. The method includes: concurrently processing methane gas and coal within a microwave plasma reactor to generate polycyclic aromatic hydrocarbons, wherein in situ methylation of the coal occurs within a reaction zone of the microwave plasma reactor. In various embodiments, the methane gas may be injected tangentially to plasma in the reaction zone.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to."

In this document, when terms such as "first" and "second" are used to modify a noun, such use is simply intended to distinguish one item from another, and is not intended to require a sequential order unless specifically stated. The terms "approximately" and "about" when used in connection with a numeric value, are intended to include values that are close to, but not exactly, the number. For example, in some embodiments, the terms "approximately" and "about" include values that are within +/−5 percent of the value, and in some embodiments values that are within +/−10 percent of the value.

In this document, the term "coupled" or "connected", when referring to two physical structures, means that the two physical structures touch each other. Devices that are connected or coupled may be secured to each other, or they may simply touch or be operably connected each other and not be directly secured to each other.

A process of producing high-quality carbon and graphitic materials made from the processing of gaseous hydrocarbon feedstock via production of high-purity polycyclic aromatic hydrocarbons is disclosed. The high-purity polycyclic aromatic hydrocarbons disclosed herein may be produced from gaseous hydrocarbon feedstocks by dehydrogenation and polymerization. This process occurs when the temperature of the hydrocarbon feedstock is raised to break some of the hydrogen-carbon and carbon-carbon bonds, resulting in production of hydrogen and acetylene, with acetylene then polymerizing into polycyclic structures, also referred to as polycyclic aromatic molecules or polycyclic aromatic hydrocarbon molecules herein. This chemical mechanism is known as the hydrogen abstraction, condensation of acetylene (HACA) process, available at: https://www.researchgate.net/figure/Reaction-schemes-of-dehydrogenation-and-condensation-during-the-cracking-of-propane-for_fig5_242356258.

In this document, the term "coal tar" or "tar" refers to a black thermoplastic material. In the prior art it was made by the destructive distillation of coal. In the present disclosure, tar can also be made by microwave pyrolysis using methods described in this document. Thus, the tar produced in the processes described in this document may be considered to be coal tar, or another type of tar (such as methane tar) depending on the feedstock used to produce it.

In this document, the term "pitch" refers to a thick (i.e., highly viscous) liquid that appears to be solid. In the prior art, pitch is typically derived from petroleum. In the present disclosure, pitch refers to the material that remain after distillation, heating or other processing of tar to remove solvent and lower boiling point fractions. Thus, "tar" and "pitch" are similar materials, except that tar is a less solid material that pitch because of the further processing.

The temperature of the gaseous hydrocarbon feedstock may be raised through various ways including surface heating, injection of preheated gases, plasma heating, or introduction of vapor phase materials. Quenching of the gas stream prevents carbonization of the formed polycyclic aromatic hydrocarbons. Collection and fractionation of the high-purity polycyclic aromatic hydrocarbons, which may also be referred to herein as polycyclic aromatic hydrocarbon molecules, polycyclic aromatic molecules, or polycyclic aromatic hydrocarbons, and may be abbreviated as "PAH", into tar and/or pitch, followed by carbonization and graphitization, results in a graphite having improved properties, including a low amount of heteroatom impurities, and increased crystal lateral dimension and stacking height.

Methane pyrolysis can be viewed as a single step reaction yielding hydrogen and solid carbon: $CH_4 \rightarrow 2H_2 + C(s)$ $\Delta H = 75.6$ kJ/mol $CH_4$ However, the actual reaction kinetics are more complex. A more accurate (though still simplified) view is that of a two-stage process. First, methane loses hydrogens, yielding methyl radicals, which quickly combine to ethane and dehydrogenate to acetylene. Then acetylene, unless promptly quenched, exothermically polymerizes in chain (HACA) reaction, releasing hydrogen and building up a mixture of polycyclic aromatic molecules, which in limit give rise to graphene and carbon black.

$2CH_4 \rightarrow 3H_2 + C_2H_2$ $\Delta H = 376.08$ kJ/mol $C_2H_2$ $C_2H_2 \rightarrow H_2 + 2C(s)$ $\Delta H = -226.88$ kJ/mol $C_2H_2$ Methane pyrolysis requires significant energy inputs, owing to the high enthalpy of formation of acetylene, with theoretical energy requirement of about 3.26 kWh/kg $CH_4$. However, full decomposition of acetylene releases about 60% of its energy back into the system (226.88 kJ/mol $C_2H_2$), which then can drive further pyrolytic reactions of methane and sustain the high temperatures, bringing the theoretical energy requirement of complete methane decomposition down to about 1.3 kWh/kg $CH_4$.

The microwave plasma provides the rapid, direct, and volumetric energy transfer to the gas necessary to quickly achieve the pyrolytic temperatures and initiate decomposition of methane or other feedstock. In the plasma reactor (first stage of the process), methane, natural case or another hydrocarbon-based feedstock is converted into acetylene, opening a path to decarbonization of the chemical production. In various embodiments, the hydrocarbon feedstock material may include hydrogen and/or carbon containing gases, liquids, and other materials such as, without limitation, aromatic alkylated aromatic, paraffinic, olefinic, cycloolefin, naphthenic, alkane, alkene, alkyl cycloalkane, alkylated cycloalkane, alkyne, or heteroatom hydrocarbons; methane, ethane, propane, butane, acetylene, syngas, natural gas, hexane, benzene, paraffins, naphthalene, polycyclic aromatics, other hydrocarbon gases, hydrogen, carbon monoxide, carbon dioxide, water vapor, hydrogen sulfide, hydrogen cyanide, alcohols (ethanol, methanol, propanol, and others), phenolic, paraffinic, naphthenic, aromatic compounds, or combinations thereof.

This work builds on acetylene's reactivity to maximize methane conversion. Acetylene is extremely reactive and will react further to yield more hydrogen and high-structure, high-purity carbon, unless it is cooled. When the acetylene is maintained at a high temperature, in the second stage of the process, acetylene molecules combine and fuse to make more complex carbon structures and hydrogen is released. In this second stage, complete and highly efficient conversion to hydrogen and solid carbon and/or a mixture of polycyclic aromatic molecules is possible. Methane pyrolysis first yields acetylene and then acetylene, in turn, if sufficient temperature conditions are maintained (e.g., above 800° C.), undergoes exothermic chain polymerization yielding either graphene sheets, PAHs, and/or carbon black depending on operating conditions. Thermally controlled second stage maximizes the conversion rate and carbon selectivity while reducing energy requirements.

Acetylene decomposition may produce hydrogen, solid carbon, a mixture of polycyclic aromatic molecules, and a tail gas. This decomposition may produce solid carbon, which, in turn, reduces $CO_2$ emissions. The term "solid carbon" as used herein includes carbon black, graphene sheets, nanocarbon materials containing graphene nanostructures as disclosed in International Patent Application Publication Number WO 2020/209975, which is incorporated by reference herein in its entirety, or any combination thereof. This decomposition may produce a mixture of polycyclic aromatic molecules, which may include benzene, graphene, and other agglomerates of carbon that assemble into droplets, adhere and release hydrogen. The mixture of polycyclic aromatic molecules may be a desired byproduct which may be used in the manufacture of other carbon materials, such as but not limited to, electrodes, synthetic graphite, and needles.

Any known plasma reactor may be used in accordance with this disclosure. Plasma heating can be direct or indirect: plasma can be used to heat the feedstock directly or to heat a heat transfer medium, such as another gas or vapor to be mixed with the feedstock. A material, including a metal, can be heated and mixed with the feedstock in vapor phase, locally heating the feedstock and providing a condensation surface. Any plasma reactor such as those disclosed in U.S. Pat. Nos. 9,095,835, 9,987,611, 10,363,542, 10,434,490, 11,021,661, US Patent Publication No. 2019/0047865, and US Patent Publication No. 2019/0046947, each of which is incorporated by reference herein in its entirety, may be used in accordance with this disclosure. The plasma reactor, which may also be referred to as a microwave plasma reactor, may eliminate flaring and reduce the carbon footprint of associated petroleum gas. The microwave plasma reactor technology addresses the need for a small footprint, modular, robust and energy efficient method for value-added utilization of waste or by-product gas streams, which are presently not valorized and instead are harmfully flared. These include industrial waste streams, such as those from coking plants or refineries, and methane/carbon dioxide-rich biogas produced by the landfills and manure management facilities of the agricultural industry. Microwave plasma enables a small-scale, low-cost process for direct, rapid and continuous conversion of hydrocarbon gases-ranging from pure methane to $CO_2$-rich effluent streams-into hydrogen and high-value solid carbons. Microwave plasma processes have lower energy requirements compared to conventional thermal plasmas, while offering reaction pathways not available for conventional chemical processes or thermal plasma reactors. The plasma reactor which performs microwave pyrolysis accepts a minimally processed gas stream to produce a single high value solid carbon product. The system is powered with electricity generated by a reciprocating engine genset, which utilizes the decarbonized effluent from the reactor and the balance of the waste gas.

The plasma reactor may be configured to receive a feed stream comprising hydrocarbons, such as, but not limited to, methane, and convert hydrocarbons in the feed stream to a product comprising a graphitic material, and/or PAHs in the presence of plasma. The plasma forming zone may include a radiation source, and a discharge tube coupled to the radiation source configured to receive a plasma forming material. The discharge tube may be made from a material that is transparent to the radio-frequency radiation. The plasma forming material may include one or more of the following: argon, hydrogen, helium, neon, krypton, xenon, carbon dioxide, nitrogen, and water. A waveguide may be configured to couple the radiation source to the discharge tube. Alternatively and/or additionally, the system may include a reaction tube configured to surround the discharge tube in the plasma forming zone to form an annulus. The feed stream flows in the annulus through the plasma forming zone. The feed stream may also comprise molecular hydrogen. The feed stream may include one or more of: aromatic, alkylated aromatic, paraffinic, olefinic, cycloolefin, naphthenic, alkane, alkene, alkyl cycloalkane, alkylated cycloalkane, alkyne, alcohol, and heteroatom hydrocarbons. Additionally and/or alternatively, the feed stream may include: methane, ethane, propane, butane, syngas, natural gas, methanol, ethanol, propanol, butanol, carbon dioxide, hexane, benzene, paraffins, polycyclic aromatic, naphthalene, or a combination thereof.

The plasma processes disclosed herein may generate PAHs from methane and other gaseous hydrocarbons, and also from coal and/or carbon in a mixture with hydrogen or with gaseous hydrocarbons. Co-processing of coal and methane to produce high-purity polycyclic aromatic hydrocarbons is also possible according to the disclosure herein. In this co-processing, in situ methylation or hydrogenation, depending on the gas, of the coal tar occurs within the reaction zone. The consequence being that it produces graphite having better crystalline properties than commercial pitch. When coal is processed along with methane, the high aromaticity of methane tar boosts aromaticity of the resulting coal tar and improves properties of products made therefrom, including synthetic graphite.

The term "graphitic materials" refers to carbon containing solids including but not limited to: amorphous and graphitic carbon blacks of varying crystallinity, carbon onions and rosettes, graphite, graphene, functionalized graphene, and graphitic and graphenic carbon structures (containing one or more layers of graphene sheets), graphite nanoplatelets, carbon nanotubes (CNTs), functionalized CNTs (or hybrid CNTs, denoted HNTs), anode coke, needle coke, and carbon fiber. The graphitic materials may be flat (completely flat and/or may include curved or curled sections), curved, curled, rosette shaped, spheroidal, or the like. In an embodiment, the graphitic material may be nano-graphene sheets, semi-graphitic particles, amorphous particles, or a combination thereof.

The plasma reactor may include a reaction zone configured to receive the plasma, receive hydrocarbon feed stream, and convert the feed stream to a product comprising the graphitic materials in presence of the plasma. Plasma received in a reaction zone may initiate selective conversion of the feed stream to the product comprising graphitic materials. Products may also include hydrogen and/or chemicals such as ammonia. For example, the streamers or diffused the non-thermal plasma may act as an energy transfer catalyst activating the feed stream and enabling acceptance of additional microwave energy into the feed stream. The ions and electrons within the streamers or diffuse non-thermal plasma collide with the feed stream to selectively activate particular molecular modes resulting in an overall increase in energy efficiency compared with traditional thermodynamic or thermal-catalytic chemical dissociation. The collisions result in energy transfer sufficient to promote cleavage of a bond (e.g., hydrogen atom to a carbon atom bond) of the feed stream. For example, for the methane within the feed stream, the $H_3C$—H bond is cleaved by electron collisions. Plasma may also rapidly transfer the energy to an energy transfer or catalytic material that can be introduced into the feed stream and initiate energy transfer sufficient to promote bond cleavages and initiate and support the cracking process.

A hydrocarbon-based feed stream (such as one comprising methane or natural gas) may be processed in a well-pad gas handling system. A typical well-pad gas handling system consists of flare headers, knockout drum, flashback seal, flare stack, and other onsite gas-handling infrastructure as required for maintenance and emergency procedures. For some well-pads, it may also include water and acid-gas scrubbers, natural gas liquid (NGL) knockout equipment, and other gas processing units. The gas handling system evens out the flow rate, temperature and pressure. The gas converter's gas control manifold then distributes the feed stream comprising hydrocarbon between one or more microwave plasma reactors, where hydrocarbons are pyrolyzed as described above. The converted hydrogen-rich gas stream carries the products of the pyrolysis process into a product recovery system employing any fluid or solid capturing system known in the art, such as bag filters, coalescing filters, impingers, wet scrubbers, gas washers, electrostatic precipitators and other such devices known in the art. For example, the product recovery system may include one or more impingers to separate and capture the aerosols and droplets of polycyclic aromatic hydrocarbons. The impinger may be any such system known in the art. For example, the impinger may be a vessel containing a solvent to dissolve and promote collection of the polycyclic aromatic hydrocarbons. The captured polycyclic aromatic molecules can be distilled to remove the lighter hydrocarbons and leave a pitch. Pitch is a solid substance at room temperature, comprised primarily of polycyclic aromatic hydrocarbon molecules. Tar or pitch may be used as road tar, in waterproofing roofs and other structures, and to make electrodes, or other carbon products. Once present, the polycyclic aromatic molecules may be captured by in-situ adsorption on the surface of solid carbon co-generated in the reaction zone or by using any of the capturing systems described herein.

Figure 2:
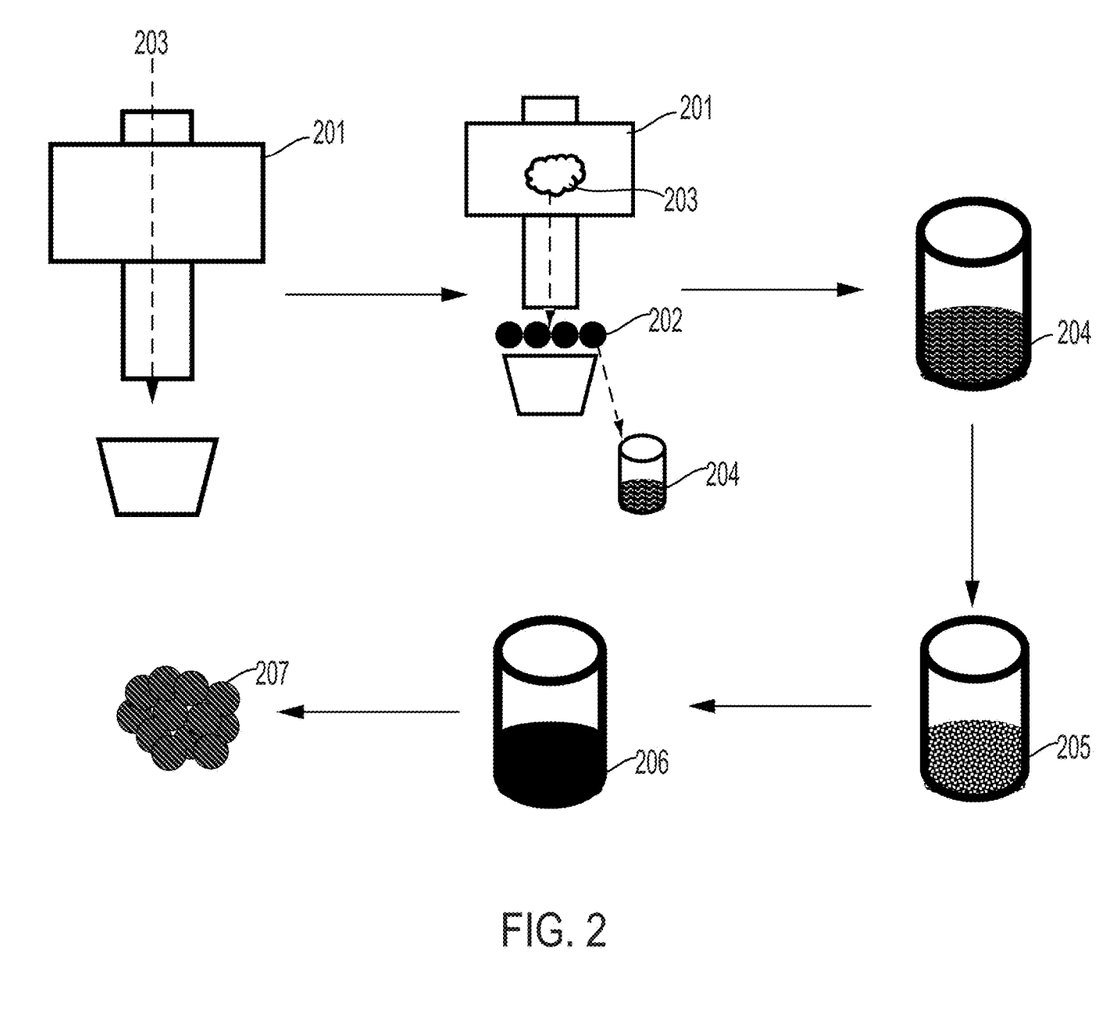
FIG. 2 shows a process flow of methane to synthetic graphite.
Figure 3A:
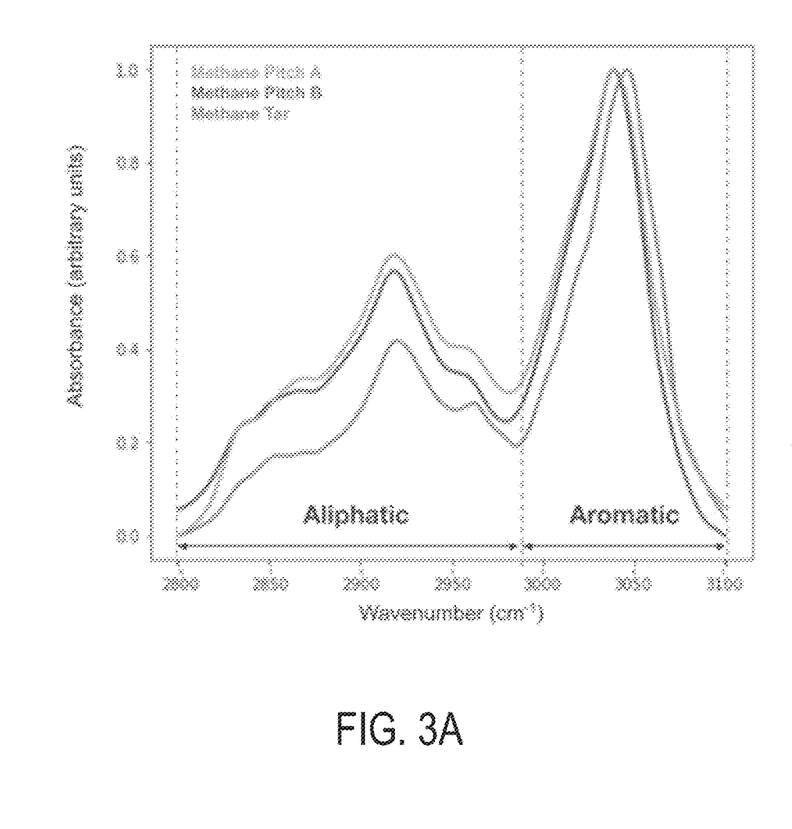
FIGS. 3A and 3B are graphs showing example aromaticity of tar or pitch produced by the processes described in this document.
Figure 3B:
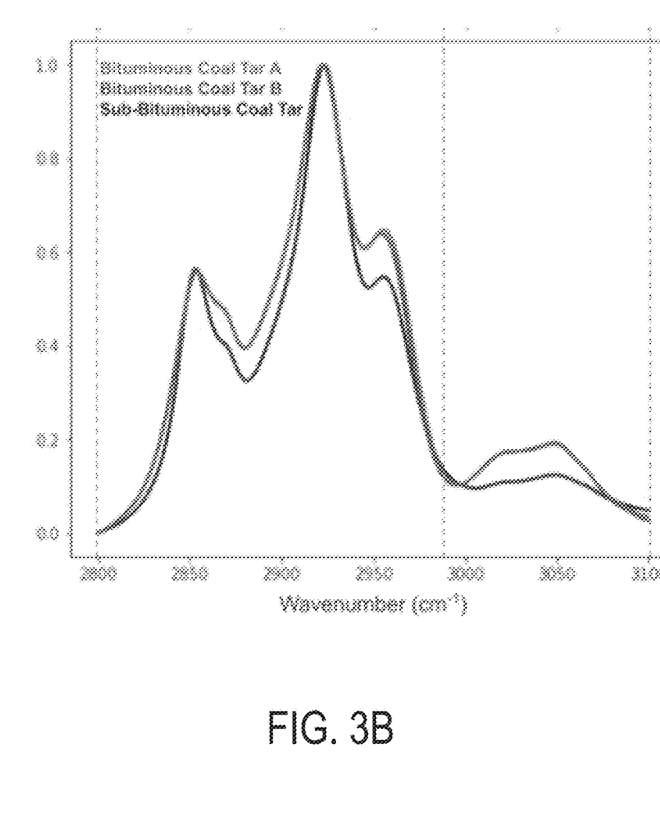

As acetylene in the hot (>1100 K) stream continues to exothermally decompose, forming polycyclic aromatic hydrocarbons through polymerization (continued dehydrogenation and edge growth of the polycyclic aromatic molecules), it releases more energy driving the pyrolysis reactions generating more hydrogen and acetylene from hydrocarbons in the feed stream. As the polycyclic aromatic hydrocarbons accumulate mass, eventually they acquire the property of a condensed phase, forming microscopic droplets or aerosols suspended in the gas stream. In purely thermal processes (carbon black or soot formation processes), the chemical growth, if unquenched, is quickly overtaken by agglomeration, as the growing polycyclic aromatic continuously collide, coalesce and grow to create nanodroplets of highly viscous tar, which carbonize, rearrange, cross-link, and solidify into what becomes primary particles and aggregates of the carbon black, which may further graphitize depending on the conditions. However, the carbonization process can be arrested by quenching the gas stream before polycyclic aromatic droplets carbonize into carbon black. This can be done, for instance, by, or via, contact cooling, as shown in FIGS. 2 and 3. The polycyclic aromatic hydrocarbons retained in vapor and aerosol form may be captured from the effluent gas stream as discussed herein, by using any means known in the art, for example, by using a coalescing filter, optionally heated to increase flow of the droplets of PAH as they coalesce on the filter.

Following pyrolysis, the effluent stream containing acetylene (referred to herein as an "acetylene feed stream") may optionally be delivered to a refractory to maximize carbonization of the polycyclic aromatic and hydrogen yield, along with reduction of $CO_2$ emissions, as disclosed in U.S. patent application Ser. No. 18/468,302, entitled PROCESSING OF FEED STREAM USING REFRACTORY FOR HYDROGEN PRODUCTION AND REDUCED CARBON EMISSIONS, filed on the same day as the present application. The entire contents of the foregoing application are incorporated by reference herein in full. Alternatively, the effluent stream can be quenched in order to reduce the stream temperature and to arrest carbonization of the polycyclic aromatic, maximizing tar or pitch yield.

Depending on the means of energy transfer into the gas stream, the gas may carry solid particles. For example, if energy transfer is effective with a hot metal vapor mixed into the gas stream, the vapor will transfer the energy to the gas as it condenses out and solidifies into solid particles. Alternatively, carbonization of the polycyclic aromatic may not be completely avoided, forming some carbon solid particles. In such case polycyclic aromatics may settle out of the gas stream onto the solid particles. These adsorbed/condensed polycyclic aromatics may then be separated from the stream and captured for further use or processing as disclosed herein. For example, separation of the condensed polycyclic aromatics from the solid particles may be achieved by heating them.

As disclosed above, there are a number of pathways to produce the high-purity PAH disclosed herein, including, but not limited to: pathway 1: concurrent production, or co-formation, of PAH and solid carbon and the capture of heavier PAH, i.e., PAH having two or more aromatic rings, by adsorption on the surface of the solid carbon, and lighter PAH species may me captured by using any gas-aerosol separation techniques known in the art; and pathway 2: augmenting reaction conditions (gas flow rate, composition, microwave power input, gas temperature, quenching, addition of catalyst, etc.) to selectively produce PAH of a pre-determined composition as the primary product. Pathway 2 may be achieved by incomplete pyrolysis of hydrocarbons such as, but not limited to, methane, propane, ethane and mixture thereof. In one embodiment, the PAH may be selectively produced by quenching the pyrolysis reaction products (primarily acetylene) using any quenching technique known in the art. In another embodiment thereof, the pyrolysis reaction products may impinge on a catalyst (including but not limited to carbonaceous and transition-metal catalysts) which selectively produces PAH.

High-purity PAH disclosed herein has low heteroatom (nitrogen, sulfur, oxygen etc.) content which decreases the number of defect sites on the synthetic graphite prepared using methane tar as the precursor. High-purity PAH as used herein means that the PAH has low quinoline insoluble and low sulfur content. The high-purity PAH may have less than about 0.1 wt. % quinoline insolubles, about 0.05 wt. % to about 0.00 wt. %, or about 0.0 wt. % quinoline insolubles. As such, the PAH has improved mesophase formation when the material is carbonized. The high-purity PAH may have less than about 0.1 wt. % sulfur, about 0.05 wt. % to about 0.00 wt. %, or about 0.0 wt. % sulfur.

High-purity PAH disclosed herein may also have high aromaticity, meaning that it is greater than 0.6. The aromaticity index of PAH disclosed herein may be greater than 0.6, greater than 0.7, about 0.65 to about 0.80, about 0.65 to about 0.75, or about 0.70 to about 0.74. In other embodiments, the aromaticity index be in the range of about 0.10 to about 0.30, or about 0.20 to about 0.25. Highly-aromatic PAH have been shown to produce synthetic graphite with excellent crystalline structure and quality—7% to 65% larger crystallite size in the lateral dimension compared to synthetic graphite produced from commercially available coal tar. Conventional coal tar has an aromaticity index ranging from 0.1 to 0.5.

Figure 1:
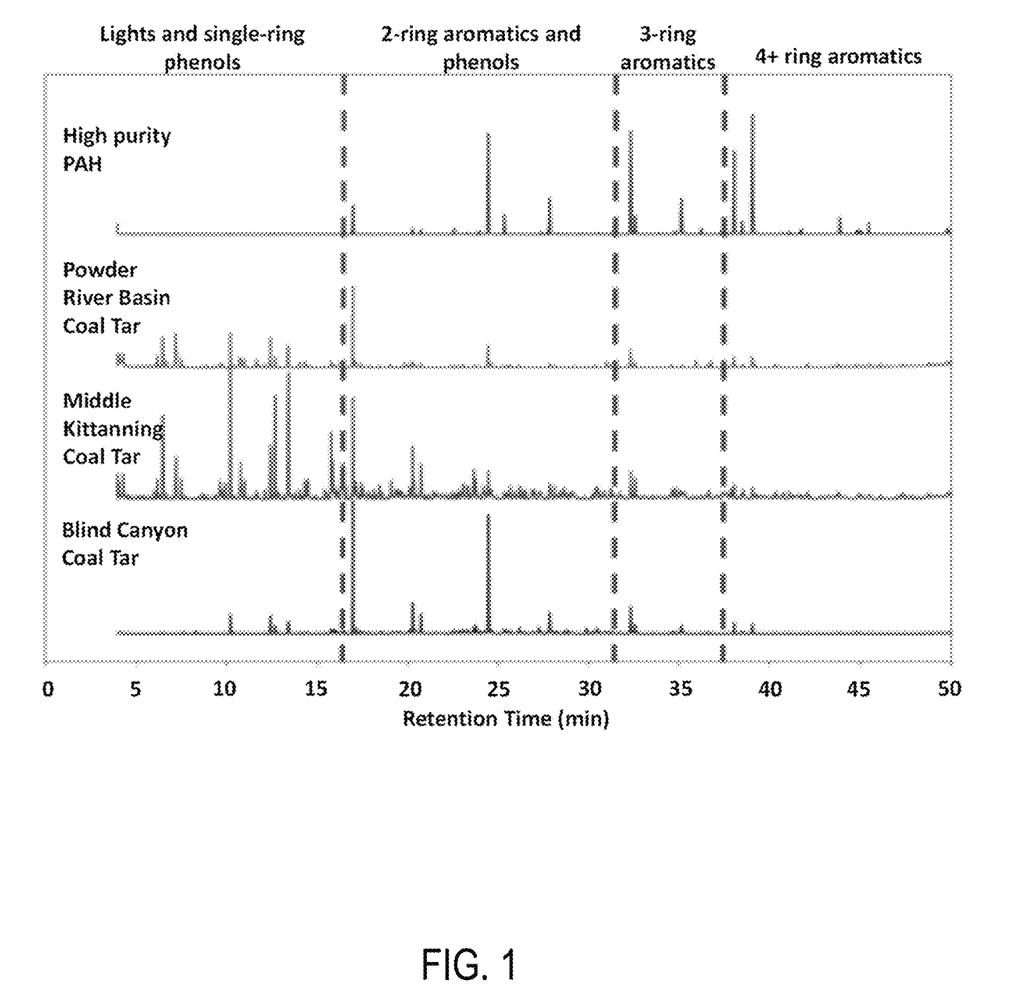
FIG. 1 is a series of graphs showing compositional makeup of an example of the PAH of the disclosure compared to conventional coal tars.

The high-purity polycyclic aromatic hydrocarbons disclosed herein may have a compositional makeup containing a majority of 2-ring, 3-ring and 4 or more-ring aromatic hydrocarbons. The high-purity polycyclic aromatic hydrocarbons may contain less than about 5% by volume of single-ring phenols such as resorcinol, 2-methylphenol, 3-methylphenol, or 4-methylphenol. The high-purity polycyclic aromatic hydrocarbons may contain over about 80% by volume of a mixture of 2-ring, 3-ring and 4 or more-ring aromatic hydrocarbons. The compositional makeup of an example of PAH disclosed herein compared to conventional coal tars is shown in FIG. 1. As evident from a review of the figure, the PAH disclosed herein, and any tar or pitch made therefrom, has a compositional makeup having less light and single-ring phenols and more 2-ring, 3-ring and 4 or more-ring aromatic hydrocarbons than conventional coal tars. Unlike coal tar, PAHs disclosed herein which may be made from methane decomposition and co-generated with solid carbon, may be devoid of light and single-ring phenols which can cause crumpling (via cross-linking) of the graphite's basal planes.

PAH disclosed herein may be pelletized, processed into tar or pitch, and then the tar or pitch may undergo carbonization and graphitization to produce graphite, also referred to as synthetic graphite. Pelletization and processing PAH into tar or pitch may be accomplished by any means known in the art.

A method of pelletization, or of making carbon pellets, may include the steps of: providing a high-purity polycyclic aromatic hydrocarbons disclosed herein and solid carbon. The high-purity polycyclic aromatic hydrocarbons and the solid carbon may be co-generated by any process disclosed herein. When they are co-generated, the solid carbon may be produced in such a way as to have increased surface area, e.g., about 7 $m^2/g$ to about 520 $m^2/g$. The pelletization method may include: applying pressure to a mixture of high-purity polycyclic aromatic hydrocarbons and solid carbon to press the mixture into compressed pellets; and heating the compressed pellets at a temperature of about 600° C. to about 1000° C. to produce the carbon pellets. The heat may be applied for any suitable period of time, such as for about 15 minutes to about 60 minutes, or even longer (including several days, or even several weeks.) The high-purity PAH acts as an organic binder which allows compression and pelletization to a high density in part due to the high surface area of the solid carbon. By using the high-purity PAH as a binder, carbon pellets may be formed which are easy to transport and handle without loss of carbon powder. The carbon pellets may have a density of about 800 $kg/m^3$ to about 1200 $kg/m^3$, or about 1000 $kg/m^3$ to about 1200 $kg/m^3$. The carbon pellets may be non-friable in some embodiments.

Pelletization may include the steps of: transferring high-purity PAH, optionally co-generated with solid carbon, which may be in the form of loose carbon powder and/or friable pellets, into a stainless steel compression vessel, one end of which is capped using a stationary plunger; inserting a mobile plunger into the compression vessel and compacting the carbon to remove trapped air; once the trapped air is removed, applying a pressure, optionally of about 1.5 kPa to about 150 kPa, using a mobile plunger to mechanically compress the carbon into pellet form; and removing the stationary plunger cap from the compression vessel and ejecting the (mechanically) compressed carbon pellet from the compression vessel, optionally using the mobile plunger. Some presses may be designed to apply even higher pressures during mechanized pelletization, in some cases as much as about 30 MPa. Accordingly, any suitable pressure in the range of about 1.5 kPa to about 30 MPa may be used. The mechanical press may be fitted with a die that shapes the pellets into a desired shape (such as cylindrical, oval, or another shape). In example applications, forces of up to 3500 N were applied to create carbon pellets using a 1.2 cm diameter cylindrical die.

Figure 7:
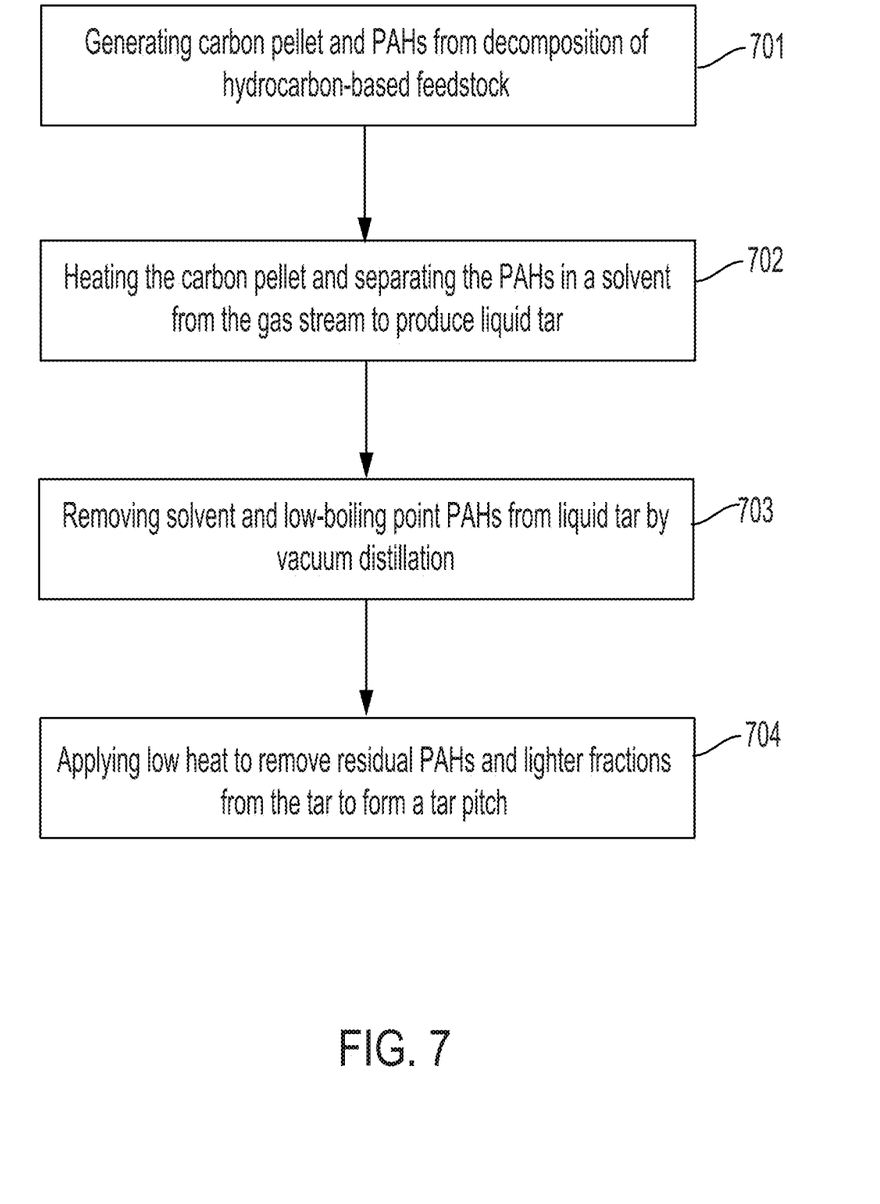
FIG. 7 is a flowchart showing a method of production and distillation of tar or pitch.

A method of making a tar or pitch from high-purity polycyclic aromatic hydrocarbons is also disclosed. Referring to FIG. 7, the method may include providing carbon pellets (701) disclosed herein by decomposition of hydrocarbon feedstock; heating the carbon pellets (702), optionally with microwave plasma and gas, to a temperature of about 500° C. to about 1200° C. Heating the generated carbon pellet and separating the PAHs in a solvent from the gas stream to produce tar in solvent; and removing the desorbed PAHs and solvent using vacuum distillation (703). The method may also include, after the vacuum distillation, applying a low heat to remove low boiling point polycyclic aromatic hydrocarbons to form a tar or pitch (704). The low heat may be about 200° C. to about 300° C.

The carbon pellets may be further processed and used as a starting material for synthetic graphite generation. With reference to FIG. 2, a process of making synthetic graphite 207 from carbon pellets 202 may use a microwave plasma reactor 201. The method includes initiating the microwave plasma and heating a reactive feedstock gas 203 in the reactor 201 comprising hydrocarbons (for example, but not limited to, a gas composed of Ar, $H_2$, CO, $CO_2$, $CH_4$, $C_2H_6$, $C_3H_8$, or any combination thereof) to a temperature ranging from about 500° C. to about 1200° C. The reactive gas may be selected to augment the properties of the carbon, the adsorbed PAHs on the carbon surface, or both. For example, a reactive oxidizing gas mixture containing $CO_2$ may be used to functionalize the PAHs with oxygenates and/or etch the carbon. In another example, $CH_4$ may be used to functionalize the PAHs with methyl groups. This may increase the temperature of the carbon in the range of about 50° C. to about 600° C. This temperature increase may be due to the hot gas on the carbon pellets and thermal energy transfer with the gas.

The reactive gas may be applied to the carbon pellets 202. Then. desorption of PAHs from the carbon surface may occur due to the increase in carbon temperature. The desorbed PAHs 204 may be entrained in the gas stream and carried to a liquid-gas separation system (e.g.: impingers filled with solvents such as, but not limited to, acetone, dichloromethane, isopropyl alcohol, toluene, pyridine, etc.) to separate the PAHs from the gas. The PAHs 204 may be mixed with a solvent, which may be removed and capturing using vacuum distillation to generate the tar 205. The tar 205 may then be heated to about 200° C. to about 300° C. to remove low boiling point PAHs (e.g., oxygenated aromatic hydrocarbons) to generate tar or pitch 206.

The tar or pitch 206 may be further processed by carbonization and graphitization to generate synthetic graphite 207. Carbonization and graphitization of tar or pitch into graphite may be accomplished by any means known in the art. See, e.g., Oberlin, A., "Carbonization and Graphitization," Carbon, Vol. 22, Issue 6, 1984, pages 521-541; Lewis, I. C., "Chemistry of Carbonization," Carbon, Vol. 20, Issue 6, 1982, pages 519-529; Franklin, R. E., "Crystallite growth in graphitizing and non-graphitizing carbons," Proc. R. Soc. Lond. A., Vol. 209, 1951, pages 196-218; Fitzer E., et al., "Recommended Terminology for the Description of Carbon as a Solid," Pure & Appl. Chem., Vol. 67, No. 3, 1995, pages 473-506; and Walker, P. L., Jr. "Carbon: An old but new material revisited," Carbon, Vol. 28, Issues 2-3, 1990, pages 261-279. For example, for carbonization, the tar or pitch may be heated to about 500° C. to about 800° C., or about 600° C., for about 2 hours to about 4 hours, or about 3 hours, at atmospheric pressure. The furnace may have a ramp rate of about 25° C./min. The chamber may be purged with 0.3 standard liters per minute (slpm) nitrogen before, during and after heating to prevent oxidation of the sample. After the carbonization period, the sample may be allowed to cool back to ambient temperature in the presence of nitrogen purge.

For graphitization, the chamber may be purged with 2 slpm argon before, during and after heating to prevent oxidation of the sample. Graphitization may be carried out at a pressure of about 2 PSIG. The sample may be heated to about 2200° C. to about 2800° C., or about 2500° C., for about 30 minutes to about 90 minutes, or about 1 hour. The ramp rate during graphitization may have 3 stages: about 15° C./min till about 2200° C.; less than about 10° C./min for about 2200° C. to about 2400° C.; and less than about 5° C./min for about 2400° C. to about 2500° C. After ramping to about 2400° C. to about 2500° C., the sample may remain at this temperature about 30 minutes to about 90 minutes, or about 1 hour. After the graphitization period, the sample may cool slowly to ambient temperature in the presence of argon purge.

In an embodiment, in the step of carbonizing, the tar or pitch may be heated to about 500° C. to about 800° C., or about 600° C., for about 2 hours to about 4 hours, or about 3 hours followed by graphitization at about 2200° C. to about 2800° C., or about 2500° C., for about 30 minutes to about 90 minutes, or about 1 hour, to produce graphite. Carbonization and graphitization may be carried out in an inert atmosphere to prevent high temperature oxidation. An example of the process flow of hydrocarbon to synthetic graphite is shown in FIG. 2 [[4]].

Graphitic quality may be measured by the graphite crystals lateral dimension (La) and stacking height (Lc). The graphite of the disclosure may have an La greater than about 100 Å, greater than about 200 Å, greater than about 300 Å, greater than about 400 Å, greater than about 500 Å, greater than about 600 Å, greater than about 700 Å, greater than about 800 Å, greater than about 900 Å, or greater than about 1000 Å. The graphite of the disclosure may have a La between about 600 Å and about 1200 Å, about 700 Å and about 1200 Å, about 800 Å and about 1200 Å, about 900 Å and about 1200 Å, or about 950 Å and about 1200 Å. The graphite of the disclosure may have an Lc greater than about 50 Å, greater than about 100 Å, greater than about 150 Å, greater than about 200 Å, or greater than about 250 Å. The graphite of the disclosure may have an La greater than about 7%, greater than about 15%, greater than about 25%, greater than about 35%, greater than about 45%, greater than about 55%, and greater than about 65% the La of graphite derived from commercial pitch. The graphite of the disclosure may have an Lc between about 50 Å and about 350 Å, about 100 Å and about 350 Å, about 150 Å and about 300 Å, about 200 Å and about 300 Å, about 250 Å and about 300 Å.

A method of making a pitch from processing of methane tar and coal tar is also disclosed. Coal tar may be processed with methane tar to produce PAH and graphite.

The polycyclic aromatic hydrocarbons disclosed herein may be further processed and used in a number of products and applications. The polycyclic aromatic hydrocarbons disclosed herein may be further processed and used in carbon foam, needle coke, jet fuel, synthetic graphite, chemicals, activated carbon, and/or synthetic metallurgical coke.

PAHs may be incorporated into activated carbon for use, e.g., in water purification. Carbon filtration media are typically employed in water filtration systems to remove undesirable atoms, molecules and ions by adsorbing and trapping them on the surface of the carbon material. The adsorption mechanism used by carbon filters may remove chlorine, mercury, dioxin, formaldehyde, pesticides, herbicides, chlorine, and/or solvents from water. Carbon filters are typically prepared using one of the following feedstocks: bituminous coal, peat, or, most commonly, coconut shells. These materials are typically carbonized at about 1000° C. and then "activated" by impinging high temperature (>1500° C.) steam which generates cracks and pores on the carbon surface, significantly increasing its surface area (>500 $m^2/g$).

The activated carbon may be produced with the high-purity PAH disclosed herein by any other process known in the art. For example, to prepare activated carbon used as carbon filters for water purification, solid carbon, which may be derived from methane and other hydrocarbon feedstocks using any of the relevant processes disclosed herein, will be coated with the PAH (in-situ or ex-situ) and then carbonized and activated in a single or multiple step process by bubbling high temperature (>1500° C.) steam through the material at a specified flow rate and duration. This process fully carbonizes the PAH and forms "bridges" between the solid carbon particles generating high surface area features which can adsorb impurities in the water. Certain solid carbon has already been shown to have high surface area (>520 $m^2/g$) prior to activation, and steam activation may significantly improve the surface area of the material. The graphitization step may be skipped for this end use application.

PAH may be incorporated into carbon foam for use, e.g., in thermal insulation. Thermal insulation materials are used in both commercial and industrial applications to limit heat loss from a source to the ambient environment. They may be used for improving the energy efficiency of homes and industrial manufacturing processes. Well-engineered thermal insulation material may prevent heat loss through conduction, convection and radiation. Parameters for thermal insulation materials include low thermal conductivity and high thermal stability. Carbon based foam insulations derived from coal tar or pitch is a new technology and has been used in applications such as aerospace tooling, fireproof wall core material, energy absorbing structures, blast protection systems, exhaust systems, and hot structures.

The high-purity PAH disclosed herein may be used to make carbon foam instead of conventionally used coal tar, which has a grave environmental impact of ~8.5 kgCO$_2$/kg-tar. With the disclosed PAH, CO$_2$-free (if the process is powered using renewable electricity) tar may be used as the precursor for generating carbon-based thermal insulation. In one embodiment, high-purity PAH derived from decomposition, and then processed into tar or pitch may be loaded into a microwave transparent vessel (e.g., quartz, aluminum oxide, etc.) and loaded into a reaction chamber. Nitrogen gas may be bubbled through the PAH and microwave energy may be applied to heat and carbonize the PAH. The energy source for carbonization need not be electromagnetic. Any energy source (resistive heating, IR, etc.) know in the art may be utilized. Bubbling nitrogen gas creates gas pockets in the now carbonized material which takes on a closed foam structure. Viscosity and composition of the tar can be controlled at the time of its generation by augmenting the processing conditions (power input, gas composition, temperature, etc.). These properties may be utilized in tandem with the carbonization process parameters (nitrogen flow rate, tar loading, etc.) to modify the properties of the carbon foam generated. See, e.g., Artimez, Matthew D., "New Method of Manufacturing Carbon Foam" (2019). Graduate Theses, Dissertations, and Problem Reports, pages 1-73, 4039 (https://researchrepository.wvu.edu/etd/4039). The trapped nitrogen has very low thermal conductivity (about 0.025 W/m·K) and limits heat loss through conduction and convection while carbon is an excellent infrared reflector and limits radiative heat losses. Any gas with sufficiently low thermal conductivity for the insulation application may be used in the place of nitrogen. Graphitization step may be skipped for this end use application.

High-purity PAH may be incorporated into needle coke or metallurgical coke for use, e.g., in the metal refining industry (iron, aluminum, etc.) (a.k.a. metal smelting) for extracting and refining metals from their ores. Metallurgical cokes are used in iron and steel industry processes, such as blast furnaces, sinter plants, and foundries to reduce iron ore to iron. Over 90 percent of the total metallurgical coke production is dedicated to blast furnace operations. Needle cokes are primarily used to prepare graphite electrodes for electric furnaces to manufacture steel and aluminum. To make the needle coke or metallurgical coke, first the high-purity PAH may be pelletized, as discussed above. For example, the PAH may be adsorbed on the carbon in-situ in the process or compounded together after being generated separately) are transformed into pellets via compression, and then heat treated at about 600° C. to about 1000° C. In this embodiment, the PAH function as a binder and are carbonized in the heat treatment process. The carbonized PAH form bridges which link the carbon black particles into a solid mass with morphology and density comparable to conventional metallurgical coke.

The synthetic needle coke disclosed herein may be transformed into end application electrodes by using the PAH to bind the graphitized carbon material. The binder coated electrode may be carbonized to improve mechanical properties.

Example 1

Polycyclic aromatic molecules were produced by processing a mix of reactant gases in a microwave plasma which employed argon and hydrogen as the plasma forming gas. The following reactant gasses and flow rates were used to generate the PAHs and solid carbon co-product:

Argon: 5-15 slpm
Hydrogen: 5-10 slpm
Methane: 24-30 slpm
Propane: 0-4.75 slpm
Carbon dioxide: 0-2.5 slpm Argon was used as the primary plasma forming gas which in-turn ionized the hydrogen and carbon dioxide injected annular to the argon. Carbon dioxide was premixed with the hydrogen prior to injection. These gasses were ionized by using microwave radiation (2.45 GHz) supplied at a power of 2.5-6 kW. The interaction of the plasma forming gasses with the microwave radiation generates a plasma which propagates in the direction of gravity and extends into the reaction zone.

Once the argon-hydrogen plasma was formed, the hydrocarbon feed gasses (methane and propane) were injected tangentially to the plasma into the reaction zone. The non-thermal plasma torch with a bulk gas temperature of 800° C.-1200° C. and 0.5-2 second residence time in the reaction zone induces hydrocarbon pyrolysis. The rise in temperature and electron-molecule collision breaks some of the hydrogen-carbon and carbon-carbon bonds, resulting in production of hydrogen and acetylene, with acetylene then polymerizing into PAH's. Once the temperature of the gas lowers to 150° C.-500° C. past the reaction zone, the PAHs condense and are entrained in and carried by the gas stream.

The PAHs were captured in-situ by adsorption on the surface of solid carbon co-generated in the reaction zone to form a carbon product made of about 10% by weight of polycyclic aromatic molecules. The carbon product containing the PAHs was collected, pelletized and heated in a static fixed bed positioned below an argon-hydrogen plasma, though other means of polycyclic aromatic molecule recovery may be employed. Thermal energy can be applied using any technique known in the art. Heat treatment desorbs the PAHs and separates them from the solid carbon. The PAHs were suspended in the plasma forming gas and carried out of the reaction zone. An impinger train filled with dichloromethane solvent was used to scrub the polycyclic aromatic molecules from the entraining gas. The PAHs were separated from the solvent using rotary evaporation and then processed by using fractional distillation techniques known in the art to make pitch. Two pitch samples (Pitch A and Pitch B) were produced by fractional distillation at two different temperatures. Pitch A was fractionated at 280° C. and Pitch B was fractionated at 320° C. Both pitches were fractionated for approximately 2 hours at the recited temperatures.

Prior to graphitization, two samples of pitch (i.e., Pitch A and Pitch B) were tested to determine the aromaticity and impurity content. Aromaticity was analyzed using Fourier transform infrared spectroscopy (FTIR), examples of which are shown in FIGS. 3A and 3B. FIG. 3A shows data for example methane pitches and an example methane tar, while FIG. 3B shows data for example coal tar. Evaluation of hydrogen aromaticity by IR spectroscopy was performed based on the determination of the peak heights and integral areas for aromatic and aliphatic C—H stretching modes. In FIG. 3A, Methane Pitch A and Methane Pitch B produced comparable results and showed very high aromatic content as indicated by their aromaticity index (0.75 and 0.77, respectively), while the Methane Tar exhibited a slightly higher aromaticity index of 0.80. Coal tars generally exhibit lower aromaticity indices than methane tars. In FIG. 3B, Coal Tar A and Coal Tar B produced comparable results as indicated by their aromaticity index (0.21 and 0.23, respectively), while the Sub-Bituminous Coal Tar exhibited a much lower aromaticity index of 0.10.

Figure 4:
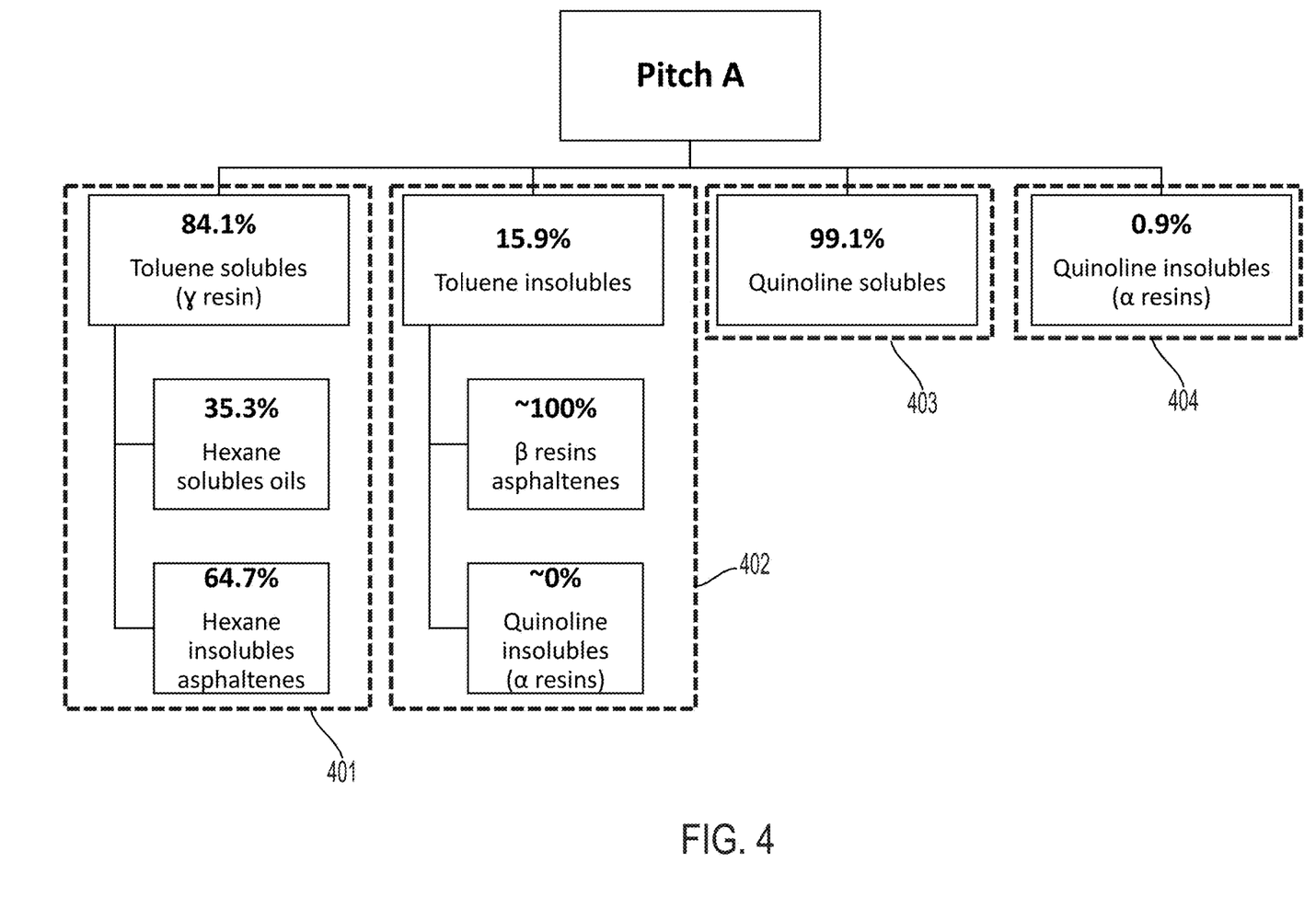
FIG. 4 is a flowchart showing a protocol for accurately measuring the solvent fractions in Pitch A.
Figure 5:
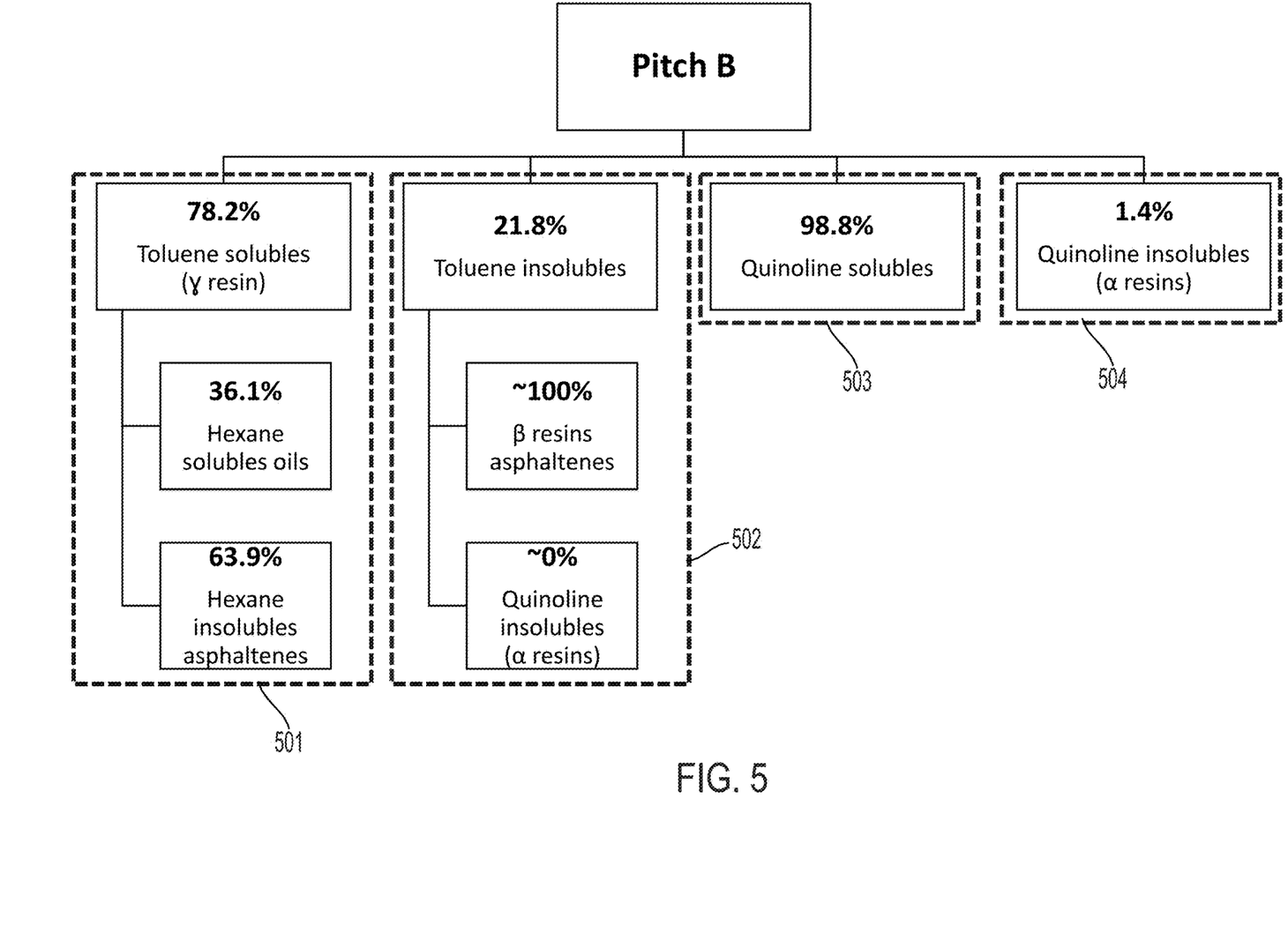
FIG. 5 is a flowchart showing a protocol for accurately measuring the solvent fractions in Pitch B.

High purity of the pitch samples Pitch A and Pitch B was confirmed using toluene and quinoline solubility tests. The toluene and quinoline compositions in Pitch A and Pitch B are shown in FIGS. 4 and 5. Both samples have very low quinoline insoluble (QI) (404, 504) content (0 wt %). A majority of the products in the pitch are toluene soluble (404, 504) (84.1% for Pitch A, 78.2% for Pitch B) of which approximately 35-30% are hexane soluble oils while the rest are insoluble asphaltenes. Comparatively, the minor toluene insoluble products (402, 502) (15.9% for Pitch A, 21.8% for Pitch B) are comprised entirely of β resin asphaltenes. The high toluene (401, 501) solubility indicates that the pitch is primarily composed of lighter aromatic fractions, those polycyclic aromatics containing up to 10 rings as confirmed by graphs in FIGS. 1 and 3.

Graphite was produced by first carbonizing the pitch samples at 600° C. for 3 hours followed by graphitization at 2500° C. for 1 hour. Carbonization and graphitization were carried out in an inert atmosphere to prevent high temperature oxidation. Both pitches were highly graphitizable and had a yield of 60%. Graphitic quality as measured by the graphite crystals lateral dimension (La) and stacking height (Lc) are an order magnitude higher than graphite derived from anthracene coke and commercial coal tar or pitch, as shown in Table 1 below.

TABLE 1

| Graphite Properties | Plane | Synthetic Graphite Precursor | | | |
| --- | --- | --- | --- | --- | --- |
| | | HQV Pitch A | HQV Pitch B | Anthracene Coke | Commercial Pitch |
| La (nm) | 110 | 118.2 | 99.5 | 110.3 | 72.0 |
| Lc (nm) | 002 | 28.5 | 25.9 | — | — |
| | 004 | — | — | 61.7 | 24.1 |
| $d_{002}$ (Å) | 002 | 3.4 | 3.4 | 3.4 | 3.4 |

As shown in Table 1, pitch samples created by methods of this disclosure which were processed into graphite and tested had crystal lateral dimensions (La) over ten times the La of prior art commercial pitch, and stacking height (Lc) over ten times the Lc of prior art commercial pitch.

Figure 6A:
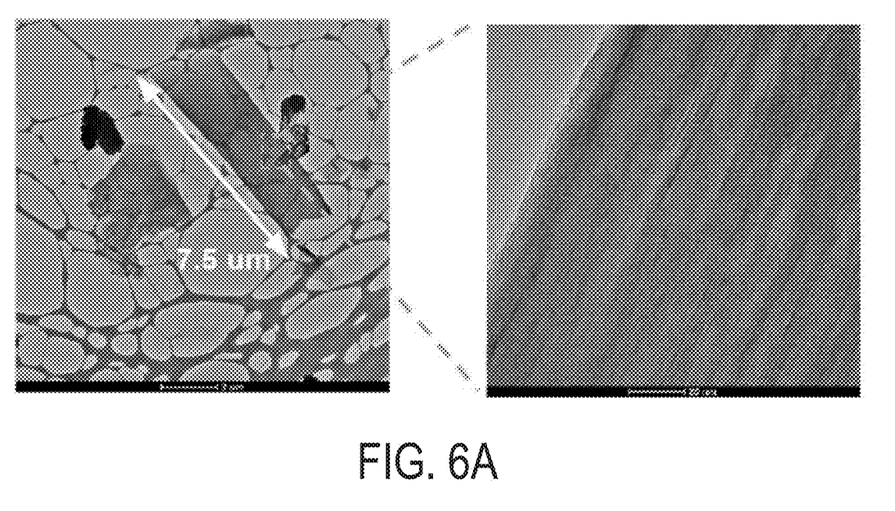
FIGS. 6A and 6B illustrate images of single crystal graphite flakes.
Figure 6B:
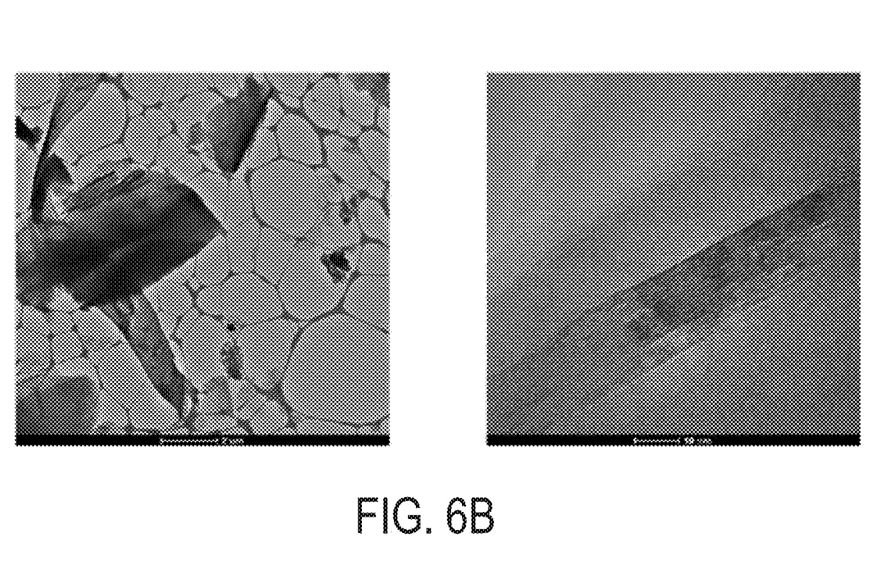

Transmission electron microscopy (TEM) images (FIGS. 6A and 6B) confirm the results. Large single crystal graphite flakes spanning several microns in length can be observed in the TEM images. Long continuous layer planes with good stacking of $d_{002}$ planes can be observed in the graphite crystal. These large single crystal graphite flakes which are several microns long may find applications in energy storage.

Example 2

Co-processing of coal and methane to produce high-purity polycyclic aromatic hydrocarbons was done. In this co-processing, in situ hydrogenation of the coal tar occurs within the reaction zone of the plasma reactor. Graphite having better crystalline properties than commercial pitch was produced. Graphitic quality as measured by the graphite crystals lateral dimension (La) and stacking height (Lc) are shown in Table 2 below.

TABLE 2

| | | Material Properties | | | |
| --- | --- | --- | --- | --- | --- |
| | Plasma | Precursor | Synthetic Graphite Crystal | | |
| Graphite Precursor | Atmosphere | Aromaticity Index | La, 110 (nm) | Lc, 002 (nm) | d, 002 (nm) |
| Test Samples | | | | | |
| Methane Pitch A | Ar—$H_2$ | 0.77 | 118.2 | 28.5 | 0.338 |
| Methane Pitch B | Ar—$H_2$ | 0.75 | 95.5 | 25.9 | 0.336 |
| Methane Tar | Ar—$CO_2$ | 0.80 | 74.6 | 24.5 | 0.337 |
| Bituminous Coal Tar | Ar—$H_2$ | 0.23 | 96.0 | 27.5 | 0.336 |
| Bituminous Coal Tar | Ar—$CO_2$ | 0.20 | 60.3 | 19.3 | 0.340 |
| Sub-Bituminous Coal Tar | Ar—$H_2$ | 0.10 | 40.6 | 14.8 | 0.339 |
| Commercial Samples | | | | | |
| Anthracene Coke | N/A | N/A | 110.3 | 61.7 | 0.336 |
| Commercial Pitch Reference Samples | N/A | N/A | 72.0 | 24.1 | 0.337 |
| Needle Coke | N/A | N/A | 85.7 | 29.0 | 0.336 |
| Shot Coke | N/A | N/A | 67.2 | 21.5 | 0.337 |

ADDITIONAL EXAMPLES

Applicant prepared several other samples of high-purity polycyclic aromatic hydrocarbons, and products including such PAHs, using parameters described above in this document. In analysis of these samples, Applicant found that the products exhibited an aromaticity index of about 0.65 to about 0.75; and had (by binding or other combination with the hydrocarbons) less than about 0.1 wt. % quinoline insolubles; less than about 0.1 wt. % sulfur. For example, one group of samples exhibited the characteristics shown in Table 3 below:

TABLE 3

| Sample | Carbon (wt %) | Hydrogen (wt %) | Nitrogen (wt %) | Sulfur (wt %) | C:H |
| --- | --- | --- | --- | --- | --- |
| Tar Sample 1 | 91.09 | 5.269 | 0.14 | 0.13 | 17.29 |
| Tar Sample 2 | 91.01 | 5.33 | 0.13 | 0.12 | 17.08 |
| Tar Sample 3 | 91.13 | 5.305 | 0.16 | 0.12 | 17.18 |
| Tar Sample 4 | 90.1 | 5.298 | 0.22 | 0.12 | 17.01 |

In addition, the pitches and tar of FIG. 3A exhibit aromaticity in the ranges listed in Table 4 below, while the tars of FIG. 3B exhibit aromaticity in the ranges listed in Table 5 below.

TABLE 4

| Sample | Aromaticity | Group | Position (cm-1) | Area (a.u.) |
|---|---|---|---|---|
| Methane Pitch A | 0.77 | Aromatic C—H | 3040.07 | 2.99 |
| | | Aliphatic-CH2 | 2919.69 | 0.91 |
| Methane Pitch B | 0.75 | Aromatic C—H | 3040.43 | 2.46 |
| | | Aliphatic-CH2 | 2919.26 | 0.83 |
| Methane Tar | 0.80 | Aromatic C—H | 3046.43 | 1.94 |
| | | Aliphatic-CH2 | 2921.17 | 0.48 |

TABLE 5

| Sample | Aromaticity | Group | Position (cm-1) | Area (a.u.) |
|---|---|---|---|---|
| Bituminous Coal Tar A | 0.21 | Aromatic C—H | 3051.29 | 0.56 |
| | | Aliphatic-CH2 | 2923.16 | 2.10 |
| Bituminous Coal Tar B | 0.23 | Aromatic C—H | 3051.04 | 0.62 |
| | | Aliphatic-CH2 | 2923.21 | 02.12 |
| Sub-Bituminous Coal Tar | 0.10 | Aromatic C—H | 3053.53 | 0.29 |
| | | Aliphatic-CH2 | 2923.83 | 2.66 |

It should be understood that the foregoing description is only illustrative of the present disclosure. Various alternatives and modifications can be devised by those skilled in the art without departing from the present disclosure. Accordingly, the present disclosure is intended to embrace all such alternatives, modifications and variances which fall within the scope of the appended claims.

The features from different embodiments disclosed in this document may be freely combined. For example, one or more features from a method embodiment may be combined with any of the product embodiments. Similarly, features from a product embodiment may be combined with any of the method embodiments disclosed in this document.

Without excluding further possible embodiments, certain example embodiments are summarized in the following clauses:

Clause 1: High-purity polycyclic aromatic hydrocarbons comprising an aromaticity index of about 0.65 to about 0.80, less than about 0.1 wt. % quinoline insoluble, and less than about 0.1 wt. % sulfur.

Clause 2: The high-purity polycyclic aromatic hydrocarbons of clause 1, comprising about 0.05 wt. % to 0.00 wt. % quinoline insolubles.

Clause 3: The high-purity polycyclic aromatic hydrocarbons of clause 1 or 2, comprising about 0.05 wt. % to 0.00 wt. % sulfur.

Clause 4: The high-purity polycyclic aromatic hydrocarbons of any preceding clause, having an aromaticity index of about 0.70 to about 0.74.

Clause 5: The high-purity polycyclic aromatic hydrocarbons of any preceding clause, wherein the high-purity polycyclic aromatic hydrocarbons contain less than 5% by volume of single-ring phenols.

Clause 6: The high-purity polycyclic aromatic hydrocarbons of any preceding clause, wherein the high-purity polycyclic aromatic hydrocarbons contain over 80% by volume of a mixture of 2-ring, 3-ring and 4 or more-ring aromatic hydrocarbons.

Clause 7: The high-purity polycyclic aromatic hydrocarbons of any preceding clause, wherein the high-purity polycyclic aromatic hydrocarbons are co-generated with solid carbon.

Clause 8: The high-purity polycyclic aromatic hydrocarbons of clause 7, wherein the co-generated solid carbon has a surface area from about 7 m2/g to about 520 m2/g.

Clause 9: A tar or pitch comprising the high-purity polycyclic aromatic hydrocarbons of one of the preceding clauses.

Clause 10: A synthetic graphite comprising the high-purity polycyclic aromatic hydrocarbons of any of clauses 1-8.

Clause 11: The synthetic graphite of clause 10, wherein the graphite comprises crystals of carbonized and graphitized high-purity polycyclic aromatic hydrocarbons having a lateral dimension (La) between about 400 Å and about 1500 Å and/or having a stacking height (Lc) between about 50 Å and about 2600 Å.

Clause 12: A method of making carbon pellets comprising: (a) providing high-purity polycyclic aromatic hydrocarbons of any of claims 1-8 and solid carbon; (b) applying pressure to a mixture of the high-purity polycyclic aromatic hydrocarbons and solid carbon to press the mixture into compressed pellets; and (c) heating the compressed pellets at a temperature of about 600° C. to about 1000° C. to produce the carbon pellets.

Clause 13: The method of clause 12, wherein providing the high-purity polycyclic aromatic hydrocarbons and the solid carbon comprises co-generating the high-purity polycyclic aromatic hydrocarbons and the solid carbon in a reaction zone from a feed stream.

Clause 14: The method of making carbon pellets of clause 12 or 13, wherein the solid carbon has a surface area from about 7 m2/g to about 520 m2/g.

Clause 15: The method of making carbon pellets of any of clauses 12-14, wherein up to 30 MPa of pressure is applied to the mixture.

Clause 16: The method of making carbon pellets of any of clauses 12-15, wherein the heating comprises heating the compressed pellets for about 15 minutes to about 60 minutes.

Clause 17: A method of making a pitch from high-purity polycyclic aromatic hydrocarbons comprising: (a) making carbon pellets according to any one of clauses 12-16; (b) heating the carbon pellets to a temperature of about 500° C. to about 1200° C.; and (c) using vacuum distillation to remove desorbed polycyclic aromatic hydrocarbons, leaving the pitch.

Clause 18: The method of clause 17, wherein heating the carbon pellets comprises using a microwave plasma and a gas to heat the carbon pellets.

Clause 19: The method of clause 17 or 18, further comprising, after the vacuum distillation, applying heat of about 200° C. to about 300° C. to the pitch to remove low boiling point polycyclic aromatic hydrocarbons.

Clause 20: A method of making carbon pellets comprising: (a) providing high-purity polycyclic aromatic hydrocarbons and solid carbon, wherein the high-purity polycyclic aromatic hydrocarbons comprise an aromaticity index of about 0.10 to about 0.30, less than about 0.1 wt. % quinoline insoluble, and less than about 0.1 wt. % sulfur; (b) applying pressure to a mixture of the high-purity polycyclic aromatic hydrocarbons and the solid carbon to press the mixture into compressed pellets; and (c) heating the compressed pellets at a temperature of about 600° C. to about 1000° C. to produce the carbon pellets.

Clause 21: The method of clause 20, wherein providing the high-purity polycyclic aromatic hydrocarbons and the solid carbon comprises co-generating the high-purity polycyclic aromatic hydrocarbons and the solid carbon in a reaction zone from a feed stream.

Clause 22: The method of making carbon pellets of clause 20 or 21, wherein the solid carbon has a surface area from about 7 m2/g to about 520 m2/g.

Clause 23: The method of making carbon pellets of any of clauses 20-22, wherein about 1.5 to about 150 kPa of pressure is applied to the mixture.

Clause 24: The method of making carbon pellets of any of clauses 20-23, wherein the heating comprises heating the compressed pellets for about 15 minutes to about 60 minutes.

Clause 25: A method of making a pitch from high-purity polycyclic aromatic hydrocarbons comprising: (a) making carbon pellets according to any one of clauses 20-24; (b) heating the carbon pellets to a temperature of about 500° C. to about 1200° C.; and (c) using vacuum distillation to remove desorbed polycyclic aromatic hydrocarbons, leaving the pitch.

Clause 26: The method of clause 25, wherein heating the carbon pellets comprises using a microwave plasma and a gas to heat the carbon pellets.

Clause 27: The method of clause 25, further comprising, after the vacuum distillation, applying heat of about 200° C. to about 300° C. to the tar or pitch to remove low boiling point polycyclic aromatic hydrocarbons.

Clause 28: A method of generating high-purity polycyclic aromatic hydrocarbons comprising: (a) concurrently processing methane gas and coal within a microwave plasma reactor to generate polycyclic aromatic hydrocarbons, wherein in situ methylation of the coal occurs within a reaction zone of the microwave plasma reactor.

Clause 29: The method of clause 28, wherein the methane gas is injected tangentially to a plasma in the reaction zone.

The invention claimed is:

1. High-purity polycyclic aromatic hydrocarbons comprising:
an aromaticity index of about 0.65 to about 0.80;
less than about 0.1 wt. % quinoline insolubles; and
less than about 0.1 wt. % sulfur.

2. The high-purity polycyclic aromatic hydrocarbons of claim 1, comprising about 0.05 wt. % to 0.00 wt. % quinoline insolubles.

3. The high-purity polycyclic aromatic hydrocarbons of claim 1, comprising about 0.05 wt. % to 0.00 wt. % sulfur.

4. The high-purity polycyclic aromatic hydrocarbons of claim 1, having an aromaticity index of about 0.70 to about 0.74.

5. The high-purity polycyclic aromatic hydrocarbons of claim 1, wherein the high-purity polycyclic aromatic hydrocarbons contain less than 5% by volume of single-ring phenols.

6. The high-purity polycyclic aromatic hydrocarbons of claim 1, wherein the high-purity polycyclic aromatic hydrocarbons contain over 80% by volume of a mixture of 2-ring, 3-ring and 4 or more-ring aromatic hydrocarbons.

7. The high-purity polycyclic aromatic hydrocarbons of claim 1, wherein the high-purity polycyclic aromatic hydrocarbons are co-generated with solid carbon.

8. The high-purity polycyclic aromatic hydrocarbons of claim 7, wherein the co-generated solid carbon has a surface area from about 7 $m^2$/g to about 520 $m^2$/g.

9. A tar or pitch comprising the high-purity polycyclic aromatic hydrocarbons of claim 1.

10. A synthetic graphite comprising the high-purity polycyclic aromatic hydrocarbons of claim 1.

11. The synthetic graphite of claim 10, wherein the graphite comprises crystals of carbonized and graphitized high-purity polycyclic aromatic hydrocarbons having a lateral dimension (La) between about 400 Å and about 1500 Å and/or having a stacking height (Lc) between about 50 Å and about 2600 Å.

12. A method of making carbon pellets comprising:
providing the high-purity polycyclic aromatic hydrocarbons of claim 1 and solid carbon;
applying pressure to a mixture of the high-purity polycyclic aromatic hydrocarbons and solid carbon to press the mixture into compressed pellets; and
heating the compressed pellets at a temperature of about 600° C. to about 1000° C. to produce the carbon pellets.

13. The method of claim 12, wherein providing the high-purity polycyclic aromatic hydrocarbons and the solid carbon comprises co-generating the high-purity polycyclic aromatic hydrocarbons and the solid carbon in a reaction zone from a feed stream.

14. The method of making carbon pellets of claim 12, wherein the solid carbon has a surface area from about 7 $m^2$/g to about 520 $m^2$/g.

15. The method of making carbon pellets of claim 12, wherein up to about 30 MPa of pressure is applied to the mixture.

16. The method of making carbon pellets of claim 12, wherein the heating comprises heating the compressed pellets for about 15 minutes to about 60 minutes.

17. A method of making a pitch from high-purity polycyclic aromatic hydrocarbons comprising:
making carbon pellets according to claim 12;
heating the carbon pellets to a temperature of about 500° C. to about 1200° C.; and
using vacuum distillation to remove desorbed polycyclic aromatic hydrocarbons, leaving the pitch.

18. The method of claim 17, wherein heating the carbon pellets comprises using a microwave plasma and a gas to heat the carbon pellets.

19. The method of claim 17 further comprising, after the vacuum distillation, applying heat of about 200° C. to about 300° C. to the pitch to remove low boiling point polycyclic aromatic hydrocarbons.

20. A method of generating high-purity polycyclic aromatic hydrocarbons according to claim 1 comprising:
concurrently processing methane gas and coal within a microwave plasma reactor to generate polycyclic aromatic hydrocarbons, wherein in situ methylation of the coal occurs within a reaction zone of the microwave plasma reactor.

21. The method of claim 20, wherein the methane gas is injected tangentially to a plasma in the reaction zone.

22. A method of making carbon pellets comprising:
providing high-purity polycyclic aromatic hydrocarbons and solid carbon, wherein the high-purity polycyclic aromatic hydrocarbons comprise:
an aromaticity index of about 0.10 to about 0.30,
less than about 0.1 wt. % quinoline insoluble, and
less than about 0.1 wt. % sulfur;
applying pressure to a mixture of the high-purity polycyclic aromatic hydrocarbons and the solid carbon to press the mixture into compressed pellets; and
heating the compressed pellets at a temperature of about 600° C. to about 1000° C. to produce the carbon pellets.

23. The method of claim 22, wherein providing the high-purity polycyclic aromatic hydrocarbons and the solid carbon comprises co-generating the high-purity polycyclic aromatic hydrocarbons and the solid carbon in a reaction zone from a feed stream.

24. The method of making carbon pellets of claim 22, wherein the solid carbon has a surface area from about 7 $m^2/g$ to about 520 $m^2/g$.

25. The method of making carbon pellets of claim 22, wherein about 1.5 to about 150 kPa of pressure is applied to the mixture.

26. The method of making carbon pellets of claim 22, wherein the heating comprises heating the compressed pellets for about 15 minutes to about 60 minutes.

27. A method of making a pitch from high-purity polycyclic aromatic hydrocarbons comprising:
   making carbon pellets according to claim 22;
   heating the carbon pellets to a temperature of about 500° C. to about 1200° C.; and
   using vacuum distillation to remove desorbed polycyclic aromatic hydrocarbons, leaving the pitch.

28. The method of claim 27, wherein heating the carbon pellets comprises using a microwave plasma and a gas to heat the carbon pellets.

29. The method of claim 27, further comprising, after the vacuum distillation, applying heat of about 200° C. to about 300° C. to the tar or pitch to remove low boiling point polycyclic aromatic hydrocarbons.

* * * * *